US008954742B2

(12) United States Patent
Moreira et al.

(10) Patent No.: US 8,954,742 B2
(45) Date of Patent: Feb. 10, 2015

(54) METHOD AND APPARATUS FOR DIGITAL AUTHENTICATION OF VALUABLE GOODS

(75) Inventors: Juan Carlos Creus Moreira, Bernex (CH); Jérôme Darbellay, Lausanne (CH); Kevin Blackman, Geneva (CH); Carlos Moreno, Petit-Lancy (CH)

(73) Assignee: Wisekey S.A., Meyrin/Geneva (CH)

( * ) Notice: Subject to any disclaimer, the term of this patent is extended or adjusted under 35 U.S.C. 154(b) by 20 days.

(21) Appl. No.: 13/056,087

(22) PCT Filed: Jul. 28, 2008

(86) PCT No.: PCT/IB2008/053022
§ 371 (c)(1),
(2), (4) Date: Apr. 18, 2011

(87) PCT Pub. No.: WO2010/013090
PCT Pub. Date: Feb. 4, 2010

(65) Prior Publication Data
US 2011/0191590 A1    Aug. 4, 2011

(51) Int. Cl.
*H04L 9/00* (2006.01)
*G06F 21/64* (2013.01)
(52) U.S. Cl.
CPC ...... *G06F 21/645* (2013.01); *G06F 2221/2153* (2013.01)
USPC ........... 713/175; 713/155; 713/156; 713/168; 726/2
(58) Field of Classification Search
CPC .. G06F 2221/2153; G06F 21/645; H04L 9/32
USPC ............. 713/155, 156, 168, 175; 705/75, 76; 726/2
See application file for complete search history.

(56) References Cited

U.S. PATENT DOCUMENTS 4,993,068 A   2/1991   Piosenka et al.
5,878,144 A   3/1999   Aucsmith et al.

(Continued)

FOREIGN PATENT DOCUMENTS

EP    1 773 018 A1    4/2007
GB    2 386 803 A     9/2003
WO    WO 2007/107068 A1    9/2007

OTHER PUBLICATIONS

International Preliminary Report on Patentability for International Application No. PCT/IB2008/053022, dated Feb. 1, 2011, 6 pages.
Report on relevant state-of-the-art research, existing technologies and products; Information Society Technologies; Nov. 2007; 88 pages.
Joseph Pearson; Securing the Pharmaceutical Supply Chain with RFID and Public-Key infrastructure (PKI) Technologies, Texas Instruments; Jun. 2005; 12 pages.
Andreas Wallstabe and Hartmut Pohl; Implementing high-level Counterfeit Security using RFID and PKI; RFID SysTech Jun. 2007; 19 pages.
RFID Technology within Healthcare and Pharmaceuticals; Institute of Validation Technology; Aug. 22-24, 2006, San Francisco, California; 16 pages.
Russian Office Action dated Jul. 24, 2012 for Russian Application No. 2011101931 filed Jul. 28, 2008.

*Primary Examiner* — Baotran N To
(74) *Attorney, Agent, or Firm* — Patterson Thuente Pedersen, P.A.

(57) ABSTRACT

A method for digital certification of authenticity of a physical object, and corresponding computer program and storage device, as well as to the use of the method for digital certification of authenticity of a physical object of value. The method includes the steps of issuing a storage device including a digital certificate of authenticity including encrypted information reflecting at least one characteristic unique to the physical object, checking, whenever required, the validity of the digital certificate of authenticity by use of a network computer, the network computer cooperating with the storage device and a validating or a certifying authority so as to output sensibly in real time the status of validity of the digital certificate of authenticity, and modifying the status of validity of the digital certificate of authenticity, whenever required.

10 Claims, 2 Drawing Sheets

(56) References Cited

U.S. PATENT DOCUMENTS

| | | |
|---|---|---|
| 6,226,619 B1 | 5/2001 | Halperin et al. |
| 6,920,561 B1 | 7/2005 | Gould et al. |
| 2003/0200431 A1* | 10/2003 | Stirbu .......................... 713/168 |
| 2005/0049979 A1 | 3/2005 | Collins et al. |
| 2006/0235805 A1 | 10/2006 | Peng et al. |
| 2007/0150737 A1* | 6/2007 | Parupudi et al. .............. 713/175 |
| 2007/0241182 A1 | 10/2007 | Buer |
| 2009/0167489 A1 | 7/2009 | Nan et al. |

\* cited by examiner

METHOD AND APPARATUS FOR DIGITAL AUTHENTICATION OF VALUABLE GOODS

TECHNICAL FIELD

The present invention pertains to a method for digital certification of authenticity of a physical object of value, to corresponding computer program means and storage means, as well as to the use of the method for the digital certification of authenticity of a physical object of value.

In general, the present invention is situated in the context of protecting objects of a certain value, in particular luxury goods, against counterfeiting, which becomes more and more difficult in the present days.

BACKGROUND ART

It is current practice that for a manufacturer of luxury goods, such as e.g. watches or precious jewelry, to issue a paper certificate of authenticity corresponding to the sold luxury product which is provided simultaneously with the product when the latter is acquired. Such paper certificates use the fact that luxury products of a certain value usually have a unique characteristic, such as e.g. a serial number, which, however, just as the object as a whole, usually is forgeable. Therefore, the producer of a forgeable, valuable object associates it with a paper certificate which reproduces the unique identifier. If the paper certificate is considered to be non-forgeable, authenticity of the valuable object can be established by requesting presentation of the certificate. Of course, the whole authentication relies on the paper certificate being produced by an authorized entity and being non-forgeable. A typical example of the above are e.g. watch brands selling high quality watches together with a paper certificate edited by the manufacturer or reseller and reproducing the serial number of an individual watch.

However, the above procedure inherently poses several problems. First, the above mentioned solution relies on it being technically impossible to fake the paper certificate. It is, however, known that such certificates based on secure paper, watermarking, RFID or other conventional techniques do no longer offer the guarantee of not being forgeable, unless the technical complexity of the procedure applied is enormously high, which on the other hand complicates the production process and renders it very expensive. This has led to the commonly known race between manufacturers of valuable goods and counterfeiters, who also increase their technical capabilities not only of producing falsified goods but also of copying such certificates. Therefore, there is a need for producers of valuable goods to find a technical solution allowing them to produce effectively non-forgeable certificates of authenticity to be handed out simultaneously with an acquired good.

Secondly, the presently known solutions for certifying authenticity of a given physical object do have the further disadvantage that, even if the certificate in the hands of the owner of a given valuable object is not faked, it is difficult and painful for the owner, who does not know this beforehand, to verify it. For example, should the owner of a given object with such a certificate doubt its authenticity, or should be contemplate its acquisition without having it reviewed by an official reseller, it would traditionally be necessary to send the certificate by mail to the manufacturer of the goods or another corresponding entity for verification. Therefore, there is a need for producers of such goods to find technical solutions simplifying this process.

Furthermore, conventional certificates of authenticity of valuable goods using e.g. secure paper, watermarking or RFID usually do only mention the main properties of the product together with the unique identifier, such as the serial number of the product. Once the certificate has been issued, it is no longer possible to flexibly add further information on the product or to easily modify the status of validity of the certificate associated to a given good. Therefore, there is also a need for the producer of such goods to find a technical solution allowing more flexible use and modification of the data contained in the certificate and relating to the goods sold.

SUMMARY OF THE INVENTION

It is the object of the present invention to overcome the above mentioned difficulties and to realize a method for certification of authenticity of a physical object of a certain value, the method providing highest possible level of security that the certificate of the authenticity cannot be faked. Furthermore, a verification of the certificate of authenticity should be much easier as compared to the known solutions and data relating to the authenticated object and/or its owner should be able to be included in the certificate in a more flexible and easier way.

To this effect, the present invention proposes a method for digital certification of authenticity of physical objects, which is characterized by the features enumerated in the claims and which enables achievement of the objectives identified above.

In particular, the method for digital certification of authenticity according to an embodiment of the present invention is characterized by the fact that the method comprises the steps of issuing a storage means comprising a digital certificate of authenticity including encrypted information reflecting at least one characteristic unique to the physical object, checking, whenever required, the validity of the digital certificate, and modifying the status of validity of the certificate, also whenever required. The fact that digital certificates issued and signed by authorized certifying authorities and stored e.g. on a cryptographic chip are not forgeable provides a solution to the above mentioned technical problem. Moreover, the validity of the digital certificate may be easily verified all over the world by using secure communication on common networks like the Internet. Furthermore, the digital certificate may flexibly be provided with additional information related to the authenticated goods or to a change of status.

Embodiments of the invention also relates to corresponding computer program means implementing the method of digital certification of authenticity according to the present invention.

Also, embodiments of the present invention propose storage means adapted for the implementation of the method, the storage means being characterized by the features enumerated in the claims, in particular being adapted to host said digital certificate of authenticity as well as to cooperate with a computing network means and a validating and/or a certifying authority to verify the validity of said certificate.

In particular, the present invention proposes the use of the method according to embodiments of the present invention in the context of authenticating physical objects of great value, like e.g. precious watches, jewelry or other luxury goods.

Other features and advantages of the present invention are mentioned in the dependent claims as well as in the accompanying and figures.

BRIEF DESCRIPTION OF THE DRAWINGS

The attached figures exemplarily and schematically illustrate the principles of the present invention.

DETAILED DESCRIPTION

In the following, embodiments of the invention shall be described in detail with reference to the above mentioned figures.

Figure 1:
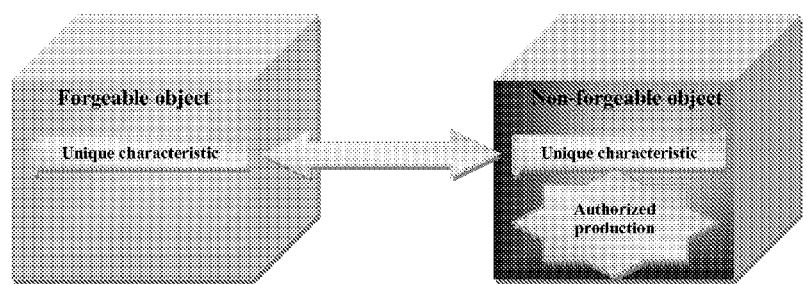
FIG. 1 schematically illustrates the principle of certification of authenticity, as used both in prior art as in the solution according to the present invention.

FIG. 1 illustrates the principle used both in conventional certificates of authenticity based on secure paper, watermarking or other traditional technologies as well as in the context of the present invention. The forgeable object like, e.g., a watch or another luxury product presented on the left side of FIG. 1 comprises a unique characteristic like e.g. a serial number. The certificate of authenticity edited by an authorized entity and considered to be non-forgeable reproduces this unique characteristic and is symbolically illustrated on the right side of FIG. 1. Whereas the non-forgeability of traditional certificates is no longer valid as soon as counterfeiters reach the corresponding level of technology required to copy these certificates, duplicating digital certificates of authenticity according to embodiments of the present invention is much more difficult, as the following description will clarify.

Figure 2:
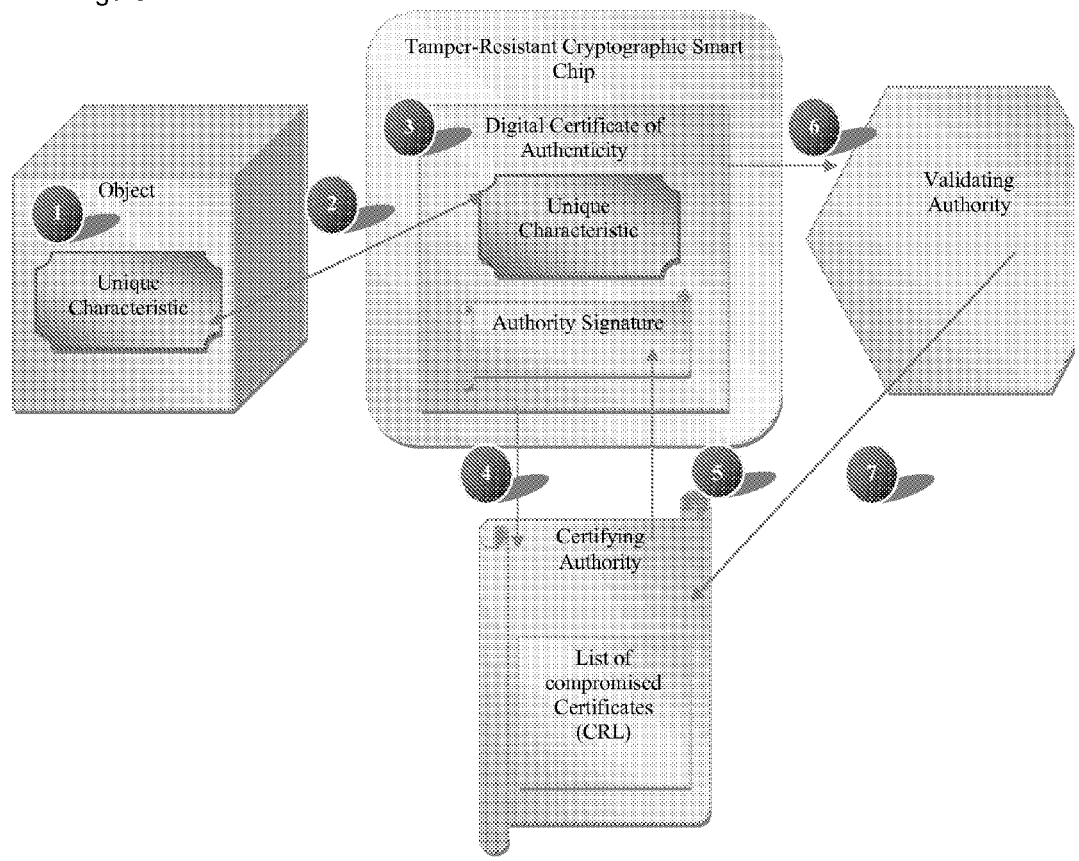
FIG. 2 is a schematic overview of the steps of the method for digital certification of authenticity of a physical object according to an embodiment of the present invention.

FIG. 2 schematically illustrates the different steps during a process of digital certification of authenticity of a physical object according to embodiments of the present invention. Of course, a physical object like a luxury product first has to be provided, after its production, with a unique identifier such as an alphanumerical serial number, this being indicated symbolically by reference number 1 in FIG. 2. The serial number may for example be engraved on the luxury product or the latter may comprise any other unique identifier adapted for this purpose.

As a first step of the method according to the invention, a digital certificate of authenticity corresponding to the luxury product has to be created. To this effect, a storage means, storage devices, which includes comprising a digital certificate of authenticity including digitally signed information that reflects at least the above mentioned unique characteristic is issued. Storage means adapted for the purposes of the present invention typically consist in cryptographic smart chips comprising computer program means allowing to create cryptographic information on-board and—at least partially—in non-exportable manner. Such smart chips are usually integrated into a cryptographic smart card. The terms "cryptographic smart chip" respectively "cryptographic smart card" will be used in the following description widely synonymously to the term "storage means". Such cryptographic smart chips are adapted to host digital certificates of authenticity according to the present invention, which then may be verified by external computing means.

Issuing a digital certificate according to embodiments of the present invention therefore comprises providing such a cryptographic smart chip. The chip is then inserted into reading and processing means, including devices such as a smart card reader in an ordinary PC used as input and output means during issuance of the digital certificate. Afterwards, as it is indicated by reference number 2 in FIG. 2, a request for issuance of the digital certificate of authenticity of the luxury product is formulated. The request file for the digital certificate reproduces the at least one characteristic unique to the luxury product by including encrypted information reflecting the at least one unique characteristic. The unique characteristic, such as an engraved serial number, may e.g. be placed in the common name field of the certificate. The request file may be formulated based on the X.509 certificate issuance standard known to the person skilled in the art.

For issuing a digital certificate, the present invention uses asymmetric encryption, this method being the best solution for such purposes according to present knowledge. Therefore, formulating the request for issuance of the digital certificate of authenticity to be created on the storage means comprises, such as indicated symbolically by reference number 3 in FIG. 2, generating an asymmetric encryption key pair comprising a public and a private key. The generation of the asymmetric encryption key pair takes place on-board the storage means and in such a manner that the private key is non-exportable. This involves the above mentioned computer program means on the cryptographic smart chip enabling creation of cryptographic information on-board and at least partially in a non-exportable manner, such programs also being called "smart chip middleware" or "drivers". Alternatively, the generation of the asymmetric encryption key pair is not performed on-board, but by secure means external to the card, and will be saved after generation on the chip such that the private key is non-exportable as well as, of course, unique. Preferably, generating the asymmetric encryption key pair, either on-board the cryptographic smart chip or by the secure means, is done by using public key cryptographic algorithms such as the Rivest-Shamir-Adleman (RSA) cryptographic algorithm or elliptic curve cryptography (ECC), this also being known to a person skilled in the art. The private key of the digital certificate of authenticity being generated in secure and unique manner, on the cryptographic smart chip or by the secure means, and in any case being stored thereon in a non-exportable manner, provides for ideal non-duplicability of the certificate chip, rendering it tamper-resistant and non-forgeable in a very effective manner.

After having formulated the request for issuance of a digital certificate such as described above, the request is sent to a certifying authority for approval, such as indicated symbolically by reference number 4 in FIG. 2. The certifying authority must be controlled and operated by authorized persons, eventually by means of automated processes, and may for example be identical to the producer of the luxury product to be certified for authenticity, or may correspond to an entity designated by the producer. Upon receipt of the request by the certifying authority, the integrity of the certificate and/or the uniqueness of the request will be verified with respect to several parameters, such as operator rights. If the verification step succeeds, the certifying authority digitally signs the request file for a digital certificate with its own certificate, the certifying authority certificate, and sends the digitally signed request file back to the storage means inserted into the reading and processing means. This step is indicated in FIG. 2 by reference number 5. Upon receipt of the signed request in the cryptographic smart chip, the above mentioned middleware completes creation of the digital certificate of authenticity by interaction with the signed request comprising approval of the certifying authority. Several aspects of this procedure may be done according to the standard procedure for X.509 certificate issuance, this is however not absolutely necessary insofar as technically equivalent alternatives are or will become available.

Once a digital certificate of authenticity has been issued on a cryptographic smart card according to the above described method, and once a luxury product has been sold in combination with its corresponding authenticity card, validity of the digital certificate and therefore authenticity of the corresponding luxury product may be checked by the owner of the product, whenever and wherever required, by use of network computing means, including computers connected to a network. To this effect, the network computing means cooperates with the storage means and the validating and/or the certifying authority so as to sensibly output, in real time, the status of validity of the digital certificate of authenticity. In this context, it is to be noted that the validating authority may be identical to the certifying authority, but this is not necessarily the case, as the former may also consist in one or several corresponding entities.

Actually, for checking the validity of the digital certificate of authenticity, one may insert the cryptographic smart card comprising the digital certificate of authenticity to any reading and processing means, i.e. any computer being equipped with a smart card reader and being configured correspondingly. Then, validity of the certificate on the smart card can be checked against a web server also configured for this purpose, this operation involving again the middleware on the smart chip. To this effect, the smart chip comprising the digital certificate of authenticity connects via network computing means to the validating authority and/or the certifying authority, such as illustrated symbolically by reference number 6 in FIG. 2. The validating authority consists typically in the above mentioned web server which is configured to be adapted to use cryptographic communication protocols such as TLS (Transport Layer Security) or SSL (Secure Socket Layer), preferably TLS, and including handshake functionality in order to provide for mutual authentication during the communication process, alternative secure communication means providing adequate functionality also being adapted to be used for this purpose. The above mentioned technical terms are known to the person skilled in the art and do not need any further explanation here.

Figure 3A:
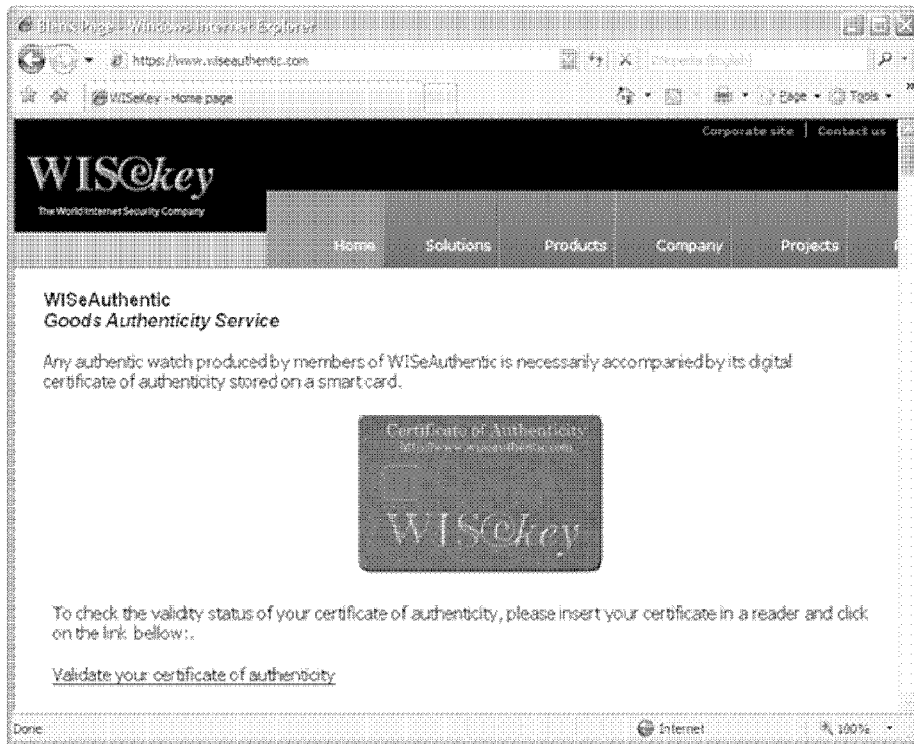
FIGS. 3a and 3b show an example of a graphical interface of a corresponding computer program during the process of checking the validity of the digital certificate, this at the stage of requesting the check respectively once the validity of the certificate has been confirmed.
Figure 3B:
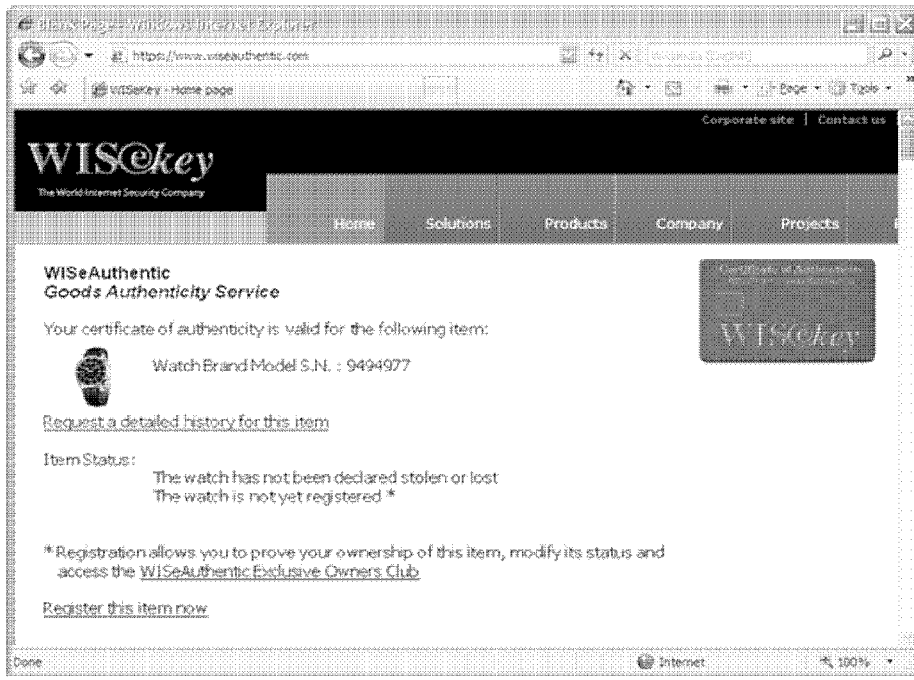

The validating authority checks the validity period of the certificate as well as whether it has been revoked, the latter against the certifying authority using e.g. a certificate revocation list (CRL) generally hosted at the certifying authority or an online certificate status protocol (OCSP), such as indicated symbolically by reference number 7 in FIG. 2. Both of these are a kind of list comprising information on issued certificates, in particular a corresponding entry in case individual certificates were compromised. Thus, this step comprises interaction of the network computing means with both the storage means and the validating and/or the certifying authority such as to allow access by the validating and/or certifying authority to the digital certificate of authority. Actually, the validity of the certificate is checked by public key exchange between the validating authority and the smart chip such as known to the person skilled in the art, and by crosscheck of the certificate with the above mentioned CRL or OCSP. This step usually involves verifying the validity of the certificate of the certifying authority known to the person skilled in the art as certificate chain validation. Then, the output in the form of the status of validity of the certificate is performed sensibly in real time via the network computing means. The output may e.g. consist in the fact that the certificate of authenticity is valid, i.e. that the luxury product is authentic, such as is illustrated in the example of a graphical interface of computer program means implementing the above described method shown in FIG. 3b. Usually, in order to facilitate use of the method by the owner of the product, the output on the graphical interface would also give some additional information, like for example the name of the series and/or of the model of the product as well as, of course, the serial number respectively the unique characteristic chosen for the purpose of the certificate, and information relative to the producer. For reasons of convenience, this information or parts of it may by the way be printed on the surface of the smart card. FIG. 3a represents an example of a corresponding graphical interface according to the present invention for a request page enabling the validation of digital certificates of authenticity, this page intended to appear just before the one shown in FIG. 3b. This demonstrates that embodiments of the present invention provide for a convenient technical solution to the problem of providing a non-forgeable certificate of authenticity which may easily, whenever as well as almost wherever, be challenged for its validity.

Embodiments of the method for digital certification of authenticity of luxury goods according to the present invention also includes the step of modifying the status of validity of the digital certificate whenever required. It might e.g. happen that the luxury product and/or the cryptographic smart card handed out together with the luxury product to the owner of the product are stolen, lost, or need repair, or suffer any other modification which would require corresponding update of the digital certificate. Therefore, the presently proposed method allows modifying the status of the digital certificate by enabling receipt of information on the status of the physical object by the certifying authority. An entry corresponding to the status information of the physical object, e.g. that it has been stolen, is then created in a database, for example in the form of the above mentioned list of compromised certificates (CRL) illustrated exemplarily in FIG. 2. The entry in the database is adapted to be read, usually by the validating authority, eventually also by the certifying authority, whenever checking the validity of the digital certificate of authenticity on the storage means occurs.

Additionally, the method according to embodiments of the present invention also provides for supplementary information which may be interesting with respect to the luxury product in question. Apart from the above mentioned information that the product was e.g. stolen or lost, such supplementary information may inter alia consist in other characteristics of the physical object or any other information related to the object or information related to the owner or to the producer of the product. By using the network computing means such as explained above, any part of the supplementary information may be put out via the network computing means and the corresponding graphical interface. It is e.g. possible in this way to provide for sales related information which may be maintained online, e.g. aiming at presenting a digital guarantee for the product. Furthermore, if the above verification of the digital certificate of authenticity is in principle anonymous due to the fact that the smart card is only related to the product in question, a facility may be provided by corresponding computer program means according to the present invention to allow personal registration of the owner of the product. Such a certified owner would then e.g. have access by using such computer program to several functions related for example to the product be acquired or to an owners' club of other persons having acquired similar goods. Also, the cryptographic smart chip may additionally include digital certificates of compliance in order to establish the compliance of the manufacturing process of the given product with a predefined set of rules, such as e.g. to obtain the label "Swiss made" or any other similar label. Such labels are issued by the corresponding controlling entity and may give additional value to the proposed method for certifying authenticity of luxury goods, it being easy to add a corresponding digital certificate of compliance on the cryptographic smart chip comprising the digital certificate of authenticity. It should be mentioned in this context that the method according to embodiments of the invention may also enable the person performing the validation of the digital certificate of authenticity to check via the network computing means the technical and operational framework of the certifying authority having issued the certificate. In particular, this concerns the certificate policy (CP) and the certificate practice statement (CPS).

After having disclosed above the method of digital certification of authenticity of luxury goods according to embodiments of the present invention, it is clear that the invention also concerns computer program means stored in a computer readable medium which is adapted to implement this method. Especially, a corresponding computer program provides the corresponding functionality and the graphical interface in order to implement the above mentioned certifying and validating authorities which are entitled to issue respectively to check the validity of the digital certificate of authenticity. Such computer program means may readily be realized by a person skilled in the art having taken note of the teaching in the present disclosure.

As already mentioned above, the present invention is also related to corresponding storage means, respectively cryptographic smart chips, for the implementation of the method according to the present invention. Such chips comprise a digital certificate of authenticity including encrypted information reflecting at least one characteristic of a physical object and are adapted to cooperate with network computing means and a validating and/or certifying authority such as to allow the latter to output the status of validity of the digital certificate. Such cryptographic smart chips adapted to the purposes of the present invention comprise middleware enabling creation of cryptographic information on-board and at least partially in non-exportable manner.

Finally, the present invention is also related to the use of the proposed method for digital certification of authenticity in the field of protecting physical objects of value against counterfeiting. Examples of such objects of value are any type of luxury goods like e.g. precious watches or jewelry.

In light of the above description of embodiments of the present invention, its advantages are clear. Primarily, a digital certificate of authenticity according to the present invention is much safer against attempts to duplicate it due to the fact that the private key is generated and stored in a non-exportable manner on the cryptographic smart chip. Therefore, non-forgeability of the certificate does not rely, such as in conventional solutions for such certificates, on technical complexity, but on the principle of non-exportability of data inside the chip, further enhanced by the complexity of the mathematical algorithms used for encryption as well as corresponding electronics of the cryptographic smart chip. Thus, even if substitution of a single authentic product by a counterfeited item showing the same, but falsified unique identifier together with a valid certificate acquired e.g. by theft cannot be avoided by the present method, it nevertheless provides for a technical solution for an efficient protection against massive, industrial counterfeiting of products having a value which justifies deployment of the above described procedure, due to the fact that the digital certificate itself cannot be duplicated industrially by counterfeiters. Moreover, validation of the digital certificate of authenticity of the product may be performed wherever and whenever required. Also, the status of the certificates of validity may be modified such as desired. Additional information may be included into the certificate respectively the smart chips also such as desired. Such digital certificates of authenticity do not alter the existing manufacturing process of the goods and may be issued by the manufacturer as well as by any authorized distributor or reseller of the goods, and may be issued for any product, even if its production dates back years ago.

The invention claimed is:

1. A method for digital certification of authenticity of a physical object, the method comprising:
   issuing a storage device comprising a digital certificate of authenticity including digitally signed information reflecting at least one characteristic unique to the physical object, the physical object being an article of manufacture, and the digital certificate of authenticity comprising the at least one characteristic unique to the physical object;
   checking, whenever required, validity of the digital certificate of authenticity by use of a network computer, the network computer cooperating with said storage device and a validating authority or a certifying authority; and
   modifying a status of validity of said digital certificate of authenticity, whenever required, by updating a certificate revocation list hosted at the validating authority or certifying authority,
   wherein, the step of issuing a storage device comprises generating an asymmetric encryption key pair comprising a public and a private key on said storage device, said private key being stored in non-exportable manner on said storage device, and the step of checking the validity of the digital certificate of authenticity comprises use of mutual authentication functionality in a form of the Transport Layer Security (TLS) or Secure Socket Layer (SSL) protocols, enabling an output sensibly in real time of the status of validity of said digital certificate of authenticity.

2. The method according to claim 1, wherein issuing said storage device includes:
   formulating a request for issuance of said digital certificate of authenticity to be created on said storage device, the request including information reflecting said at least one unique characteristic;
   sending said request to the certifying authority for approval;
   verifying and, if positively verified, digitally signing said request by said certifying authority;
   sending the signed request to the storage device; and
   completing creation of the digital certificate of authenticity on said storage device by interaction with said signed request comprising approval of the certifying authority.

3. The method according to claim 1, wherein generating the asymmetric encryption key pair on said storage device is done by using public key cryptographic algorithms.

4. The method according to claim 1, wherein checking the validity of the digital certificate of authenticity comprises:
   connecting the storage device comprising the digital certificate of authenticity via the network computer to the validating authority or the certifying authority;
   interaction of the network computer with the storage device and the validating authority or the certifying authority allow enabling access by said validating authority or certifying authority to the digital certificate of authenticity or to the information reflecting at least one characteristic unique to the physical object;

outputting sensibly in real time the status of validity of said digital certificate of authenticity via the network computer.

5. The method according to claim 1, wherein modifying the status of validity of said digital certificate of authenticity on the storage device comprises:
receiving information on the status of the physical object by the certifying authority; and
creating an entry corresponding to the status information of the physical object in a database, the entry being adapted to be read by the validating authority whenever checking of the validity of the digital certificate of authenticity on the storage device occurs.

6. The method according to claim 1, wherein the method further comprises:
receiving supplementary information reflecting one or more other characteristics of the physical object or any other information related to that object or to the owner or the producer of that object by the certifying authority; and
outputting, on demand, any part of said supplementary information via the network computer.

7. The method according to claim 1 for digital certification of authenticity of a physical object of value.

8. The method according to claim 7, wherein the physical object of value consists of luxury goods, in particular precious watches, jewelry.

9. The method according to claim 1, wherein checking the validity of the digital certificate of authenticity comprises accessing the private key for the mutual authentication functionality without entering any identification information.

10. A non-transitory computer readable medium storing a computer program to cause a computer to implement a method for digital certification of authenticity of a physical object, the method comprising:
issuing a storage device comprising a digital certificate of authenticity including digitally signed information reflecting at least one characteristic unique to the physical object, the physical object being an article of manufacture, and the digital certificate of authenticity comprising the at least one characteristic unique to the physical object;
checking, whenever required, validity of the digital certificate of authenticity by use of a network computer, the network computer cooperating with said storage device and a validating authority or a certifying authority; and
modifying a status of validity of said digital certificate of authenticity, whenever required, by updating a certificate revocation list hosted at the validating authority or certifying authority,
wherein, the step of issuing a storage device comprises generating an asymmetric encryption key pair comprising a public and a private key on said storage device, said private key being stored in non-exportable manner on said storage device, and the step of checking the validity of the digital certificate of authenticity comprises use of mutual authentication functionality in a form of the Transport Layer Security (TLS) or Secure Socket Layer (SSL) protocols, enabling an output sensibly in real time of the status of validity of said digital certificate of authenticity.

* * * * *